(12) United States Patent
Van Stralen et al.

(10) Patent No.: US 7,981,485 B2
(45) Date of Patent: Jul. 19, 2011

(54) APPARATUS AND METHOD FOR PERFORMING A PCVD PROCESS

(75) Inventors: Mattheus Jacobus Nicolaas Van Stralen, Tilburg (NL); Johannes Antoon Hartsuiker, Eindhoven (NL); Antonius Henricus Johannes Petrus Maria Linders Molthoff, Waalre (NL); Igor Milicevic, Helmond (NL)

(73) Assignee: Drake Comteq, B.V., Amsterdam (NL)

( * ) Notice: Subject to any disclaimer, the term of this patent is extended or adjusted under 35 U.S.C. 154(b) by 673 days.

(21) Appl. No.: 11/939,931

(22) Filed: Nov. 14, 2007

(65) Prior Publication Data

US 2009/0022906 A1  Jan. 22, 2009

(30) Foreign Application Priority Data

Nov. 14, 2006  (NL) .................................... 1032867

(51) Int. Cl.
  *H05H 1/30* (2006.01)
(52) U.S. Cl. ..................... 427/575; 427/569; 427/248.1; 427/255.18; 65/391
(58) Field of Classification Search .......................... None
  See application file for complete search history.

(56) References Cited

U.S. PATENT DOCUMENTS

| | | | |
|---|---|---|---|
| 4,117,802 A * | 10/1978 | Le Sergent et al. | 118/725 |
| 4,314,833 A | 2/1982 | Kuppers | |
| 4,714,589 A | 12/1987 | Auwerda et al. | |
| 4,857,091 A * | 8/1989 | Geittner et al. | 65/391 |
| 4,877,938 A | 10/1989 | Rau et al. | |
| 5,211,731 A | 5/1993 | Busse et al. | |
| 6,260,510 B1 | 7/2001 | Breuls et al. | |
| 6,901,775 B2 | 6/2005 | de Sandro et al. | |
| 7,092,611 B2 | 8/2006 | Simons et al. | |
| 2003/0115909 A1 | 6/2003 | House et al. | |
| 2005/0172902 A1 | 8/2005 | Van Stralen et al. | |
| 2007/0003197 A1 | 1/2007 | Matthijsse et al. | |
| 2009/0022906 A1 | 1/2009 | Van Stralen et al. | |

FOREIGN PATENT DOCUMENTS

| | | |
|---|---|---|
| EP | 0261742 A | 3/1988 |
| EP | 1550640 A | 6/2004 |
| EP | 1550640 A1 | 6/2005 |
| EP | 1425249 A | 7/2005 |

(Continued)

OTHER PUBLICATIONS

Dutch Search Report and Written Opinion in corresponding Dutch Patent Application No. 1032867, dated Mar. 5, 2007.

(Continued)

*Primary Examiner* — David Turocy
*Assistant Examiner* — Joel G Horning
(74) *Attorney, Agent, or Firm* — Summa, Additon & Ashe, P.A.

(57) ABSTRACT

The present invention relates to an apparatus for carrying out a PCVD process in which one or more doped or undoped glass layers are coated onto the interior of a glass substrate tube. The apparatus comprises an applicator having an inner wall and an outer wall and a microwave guide that opens into the applicator. The applicator extends around a cylindrical axis and which is provided with a passage adjacent to the inner wall, through which the microwaves supplied via the microwave guide can exit, over which cylindrical axis the substrate tube can be positioned, while the applicator is fully surrounded by a furnace that extends over the cylindrical axis.

15 Claims, 4 Drawing Sheets

FOREIGN PATENT DOCUMENTS

| | | | |
|---|---|---|---|
| EP | 1923360 | A1 | 5/2008 |
| GB | 2068359 | A | 8/1981 |
| JP | 06271329 | A * | 9/1994 |
| WO | 99/35304 | A1 | 7/1999 |
| WO | 03/022760 | A1 | 3/2003 |
| WO | 03/086998 | A1 | 10/2003 |

OTHER PUBLICATIONS

European Office Action in counterpart European Application No. 07021689.0, dated Feb. 9, 2009.

European Search Report for corresponding European Application No. 07021689, dated Mar. 6, 2008.

* cited by examiner

APPARATUS AND METHOD FOR PERFORMING A PCVD PROCESS

CROSS-REFERENCE TO PRIORITY APPLICATION

This application claims the benefit of pending Dutch Application No. 1032867 (filed Nov. 14, 2006, at the Dutch Patent Office), which is hereby incorporated by reference in its entirety.

FIELD OF THE INVENTION

The present invention relates to an apparatus for carrying out a PCVD process in which one or more doped or undoped glass layers are coated onto the interior of a glass substrate tube. The apparatus includes an applicator having an inner wall and an outer wall and a microwave guide that opens into the applicator. The applicator, which extends around the glass substrate tube's cylindrical axis, defines a passage adjacent to or in its inner wall. Microwaves, supplied by a microwave guide, can exit through this passage to the substrate tube. The applicator is fully surrounded by a furnace that likewise extends over the substrate tube's cylindrical axis.

The present invention further relates to a method for manufacturing a preform using such an apparatus.

BACKGROUND OF THE INVENTION

One way of manufacturing an optical preform is the Plasma Chemical Vapor Deposition (PCVD) process. The PCVD process is known, for example, from U.S. Pat. No. 4,314,833, which is incorporated by reference in its entirety. According to the disclosed process, one or more doped or undoped glass layers are deposited onto the interior of a substrate tube using low-pressure plasma in the glass substrate tube. After the glass layers have been deposited onto the interior of the glass substrate tube, the glass substrate tube is subsequently contracted by heating into a solid rod. In one embodiment, the solid rod may be externally provided with an additional amount of glass (i.e., by means of an external vapor deposition process), or by using one or more preformed glass tubes, thereby obtaining a composite preform. From this preform, one end is heated to produce optical fibers.

International Application No. WO 99/35304 (and its counterpart U.S. Pat. No. 6,260,510), which is incorporated by reference in its entirety, disclose microwaves from a microwave generator that are directed via a waveguide toward an applicator that surrounds a glass substrate tube. The applicator couples the high-frequency energy into the plasma. At one end of the substrate tube the doped or undoped reactive gases are supplied, after which a reaction takes place under the influence of the plasma, and doped or undoped glass layers are deposited onto the interior of the substrate tube. The other end of the substrate tube is connected to a vacuum pump so that a reduced pressure (e.g., between 5 and 50 mbar) is provided in the interior of the substrate. The applicator is moved reciprocally in the longitudinal direction of the substrate tube so that a thin glass layer is deposited onto the interior of the substrate tube with every stroke. The applicator and the substrate tube are generally surrounded by a furnace so as to maintain the substrate tube at a temperature of 900° C. to 1300° C. during the deposition process.

European Patent No. EP 1,550,640 (and its counterpart U.S. Publication No. 2005/0172902), which is commonly assigned with the present application and which is incorporated by reference in its entirety, disclose an apparatus for carrying out a PCVD process in which an annular choke having a specific length and width is positioned within the applicator such that the choke is centered around a cylindrical axis. The dimensions of the choke are selected to minimize the losses of high-frequency energy during the entire deposition process. This leads to more efficient energy consumption.

U.S. Pat. No. 6,901,775, which is incorporated by reference in its entirety, discloses an apparatus for internally coating a substrate tube by means of a PCVD process, from which substrate tube a preform is made. The gas delivery unit includes an insert, which is claimed to prevent a disturbance that induces a standing wave of a certain period and amplitude in the gas flow. According to this U.S. patent, a disturbance in the gas mixture flow can induce a standing wave of a certain period and amplitude in the gas mixture flow. This standing wave is responsible for a given deposition within the internal region of the substrate tube that is characterized by a non-uniform thickness along its axial direction. The non-uniformity in the thickness of the deposition translates to non-uniformity in the outer diameter of the corresponding collapsed preform and the resultant optical fiber.

These PCVD processes notwithstanding, there continues to be a need for an apparatus and method for achieving an optical fiber preform that possesses improved deposition uniformity along its length with respect to both refractive index and deposition thickness (i.e., cross-sectional area).

SUMMARY OF THE INVENTION

One aspect of the present invention is to provide a glass substrate tube having vapor-deposited glass layers of essentially uniform thickness and essentially uniform refractive index in the axial direction (i.e., along the length of the substrate tube). Subsequently, this substrate tube is further processed into a solid rod via a contraction process and, thereafter, the solid rod is converted into an optical fiber via a number of processing steps.

Another aspect of the present invention is to provide an apparatus and a method for carrying out a PCVD process. In this regard, the apparatus is configured to reduce, if not minimize, disturbances of the microwave energy from the applicator (i.e., resonator). It has been observed that such disturbances adversely affect the optical performance of the resulting optical fiber preform.

In this regard, the present invention embraces a furnace that is reciprocally movable during deposition with respect to the substrate tube along the longitudinal axis thereof (i.e., along the length of the glass substrate tube). The furnace maintains the glass substrate at elevated temperatures (e.g., 800° C. or more) during the PCVD process.

One or more of the foregoing aspects are accomplished by using the present apparatus. After extensive research and observations with respect to microwave-activated plasma, the present inventors have found that non-uniform distribution of the microwave energy appears to be caused inter alia by dispersion or scattering of the microwave power. Without wishing to be bound by any theory, the present inventors believe that some of the microwave power is reflected by conductive surfaces (e.g., the inner wall of the surrounding furnace) as well as by semi-conductive surfaces.

More generally, it can be stated that microwaves are reflected at the moment a transition of materials takes place (e.g., air-water, metal-plastic, air-ceramics, and the like). Thus, it is assumed that the resulting distribution of the microwaves relative to the applicator depends on the position of the applicator, causing so-called non-uniform microwave powers, which may result in non-uniform temperatures and even multiple plasmas.

The present inventors have found that by making the applicator and the furnace reciprocally movable during deposition with respect to the longitudinal axis of the substrate tube, the non-uniform microwave distribution during the PCVD process is weakened or even reduced to a minimum. One surprising result is that the refractive index value of the substrate tube achieved in accordance with the present invention (i.e., after internal deposition) is substantially uniform along its length.

Moreover, the present inventors have found that the so-called cross-sectional area (CSA) of the substrate tube as a function of the axial position thereof is substantially uniform. The cross-sectional area (CSA) for a given layer (or layers), which is determined on the basis of the thickness of the vapor-deposited layers, can be calculated from the external diameter of the layer(s) (i.e., $d_u$) and the internal diameter of the layer(s) (i.e., $d_i$), as follows:

$$csa = \frac{\pi}{4}(d_u^2 - d_i^2)$$

In a particular embodiment, during the PCVD process the substrate tube is typically fixed (e.g., clamped) in position in the apparatus on both ends thereof and the applicator and the furnace are movable along the longitudinal axis of the substrate tube. Such a configuration is particularly advantageous because the existing PCVD equipment can be adapted in a simple manner. It is also possible to rotate the substrate tube during the deposition process or externally flush it with an inert gas so as to prevent deposition of furnace particles on the outer side of the substrate tube.

To realize effective operation of the present invention, the distance over which the applicator is movable between a point of reversal located at the substrate tube's supply side and another point of reversal located at the substrate tube's discharge side is typically selected so that the furnace will surround the applicator at all times during the PCVD process. The moving of the furnace may take place continuously or discontinuously (e.g. stepwise furnace movement). Stated otherwise, the applicator will be moved in such a manner during the deposition process that the furnace, which is likewise movable, will surround the applicator at all times (i.e., the applicator does not move outside the furnace during the PCVD process). In other words, the applicator, which is movable along the length of the substrate tube, will at all times be positioned within the furnace, which is likewise movable along the length of the substrate tube.

The deposition of glass layers takes place along the distance over which the applicator is moved. The substrate tube has a length greater than the sum of the length of the furnace and the "stroke" of the movable furnace. The reason for this is that both ends of the substrate tube are fixed in clamps, which cannot withstand the high temperature that prevails in the furnace.

The applicator is usually cylindrically symmetrical and annular in shape. In this regard, the applicator defines an annular resonator space that extends cylindrically symmetrically around a cylindrical axis.

The applicator (and/or its resonator space) defines a slit that extends in a full circle around the cylindrical axis. Microwave energy from the microwave guide, which opens into the resonator space, is transported (i.e., transmitted) through the slit.

To realize an optimal transfer of microwave energy, the waveguide typically has a longitudinal axis that extends substantially perpendicularly to the cylindrical axis and that does not intersect the slit or the passage. Moreover, the waveguide's longitudinal axis does not divide the resonator space into two equal halves.

In accordance with the present invention, during working deposition the applicator and the furnace may move in the same direction or in opposite directions along the length of the substrate tube.

In a particular embodiment, during deposition the furnace moves in a stepwise movement along the length of the substrate tube. The stepwise movement may be understood to embrace moving of the furnace to a location (e.g., at the discharge side of the substrate tube), maintaining this position for some time, and subsequently returning the furnace to the original or other location (e.g., at the supply side of the substrate tube). This latter position is typically maintained for some time as well, whereupon the furnace is returned to the location at the discharge side of the substrate tube.

It is also possible to move the furnace in steps (e.g., from the supply side towards the discharge side), during which stepwise movement the furnace is stationary for some time at specific positions along the length of the substrate tube (e.g., an incremental, stop-start progression). According to such a velocity profile, the furnace is moved reciprocally along the length of the substrate tube in steps over time.

The aforementioned kinds of cycles may be repeated during the entire deposition process or during only part of the deposition process. The present inventors have found that the cycle time of the above-described furnace movement typically ranges between one and 600 seconds (i.e., ten minutes). A period of more than 600 seconds tends to lead to disturbances in the profile; a period of less than one second tends to lead to insufficient results with respect to the intended uniformity of the cross-sectional area and the refractive index profile. In addition, a period of less than one second may introduce mechanical problems.

In the embodiment of the present invention in which the furnace and the applicator move along the length of the substrate tube, the ratio between the cycle time of the furnace and the cycle time of the applicator does not equal an integer. To determine this ratio, of course, the quotient of the longest cycle time divided by the shortest cycle time is calculated.

The movement of the furnace over the substrate tube typically equals an uneven multiple of a quarter of the wavelength of the microwaves being used. In this context, the term "movement" refers to the distance over which the furnace is moved in the longitudinal direction of the substrate tube. In practice, suitable microwaves have a frequency of, for instance, 890 MHz, 2.45 GHz, or 5.8 GHz. In practice, distances of three centimeters, nine centimeters, and 15 centimeters and the like are particularly used. These exemplary distances reflect relatively short movements compared with the length of the glass substrate tube. Other distances for furnace displacement are certainly within the scope of the invention.

According to another embodiment of the present invention, the furnace moves continuously between a first location at the substrate tube's supply side and a second location at the substrate tube's discharge side. In that case, the distance over which the furnace is moved is typically an uneven multiple of a quarter of the wavelength of the microwaves being used. Moreover, when comparing the cycle time of the furnace to the cycle time of the applicator, the quotient of the longest cycle time and the shortest cycle time typically does not equal an integer. For practical, mechanical reasons, the rate of movement of the furnace is typically less than 5 cm/sec, more typically less than 1 cm/sec. Faster velocities, however, are certainly within the scope of the invention. Moreover, the furnace can move along the length of the substrate tube at either a constant speed or a variable speed.

Although a moving furnace has been described thus far, it is also possible in an alternative embodiment to provide the furnace internally with parts or elements that move along the length of the substrate tube. In such an embodiment the furnace as such is stationary, while the parts or elements, typically made of a metal and arranged concentrically around the substrate tube, are moved along the length of the substrate tube. As noted, such movement during the deposition process helps to reduce microwave energy disturbances.

According to yet another embodiment of the present invention, the substrate tube, including the connections known to those having ordinary skill in the art, is movable with respect to the stationary furnace and applicator. It is within the scope of the invention to move both the substrate tube and the applicator during the PCVD process.

The term "movable along the longitudinal axis" as used herein refers to movement along the length of the substrate tube. Such movement can take place parallel or non-parallel to the substrate tube (i.e., seen in the longitudinal direction thereof). For example, movement relative to the substrate tube may be at a certain angle (e.g., from the upper side to the bottom side or from the front side to the rear side).

The present invention further relates to a method for manufacturing a preform. In this regard, the method embraces carrying out a PCVD process for depositing one or more doped or undoped glass layers onto the interior of a glass substrate tube, characterized in that the PCVD is performed by employing the foregoing apparatus. The substrate tube is placed within the inner wall of the applicator over a cylindrical axis (i.e., the substrate tube and the applicator are essentially co-axial). Glass-forming precursors are supplied to the interior of the substrate tube, and the applicator and the furnace are moved reciprocally along a length of the substrate tube during deposition.

The foregoing, as well as other characteristics and advantages of the present invention, and the manner in which the same are accomplished, are further specified within the following detailed description and its accompanying drawings.

DETAILED DESCRIPTION

Figure 1:
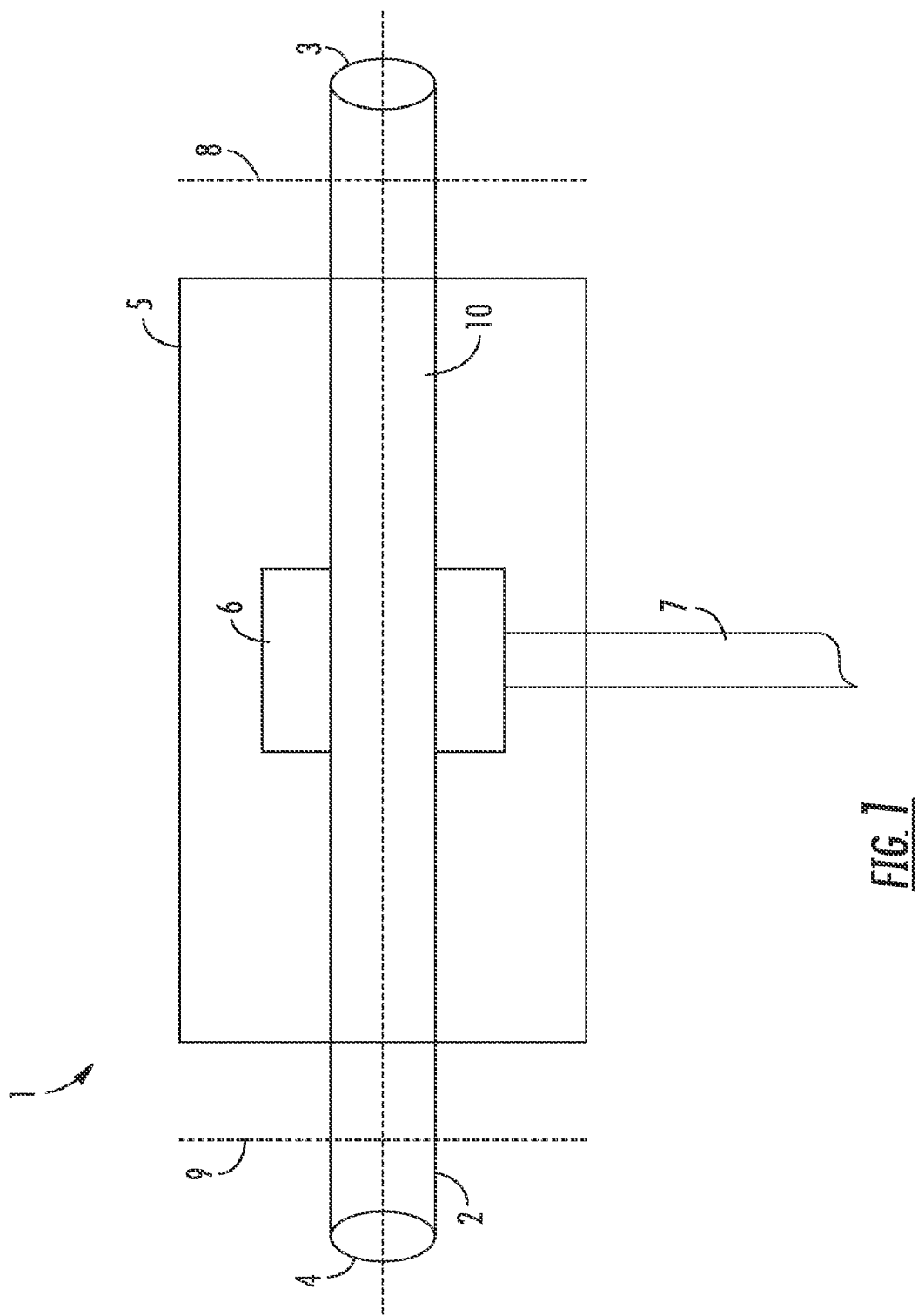
FIG. 1 shows the apparatus according to the present invention for carrying out a PCVD process.

FIG. 1 depicts a PCVD apparatus 1 in which a glass substrate tube 2 is positioned over a cylindrical axis 10. The glass substrate tube 2 (as depicted) is provided with a supply side 4 at its left end and a discharge side 3 at its right end. Glass forming precursors are supplied to the interior of the substrate tube 2 at its supply side 4.

The apparatus 1 includes an applicator 6 having an inner wall and an outer wall and a microwave guide 7 for guiding microwaves into the applicator 6 (i.e., the microwave guide 7 opens into the applicator 6). The applicator 6 is movable along the cylindrical axis 10 between a point of reversal located at the supply side 4 and another point of reversal located at the discharge side 3.

The applicator 6 is surrounded by a furnace 5 that extends over the cylindrical axis 10. During the deposition process, the furnace 5 is also reciprocally movable with respect to the substrate tube 2 along the longitudinal axis thereof. In other words, the furnace 5 is movable along the length of the substrate tube 2 between (i) a first location 9 at the supply side 4 of the substrate tube 2 and (ii) a second location 8 at the discharge side 3 of the substrate tube 2.

During the deposition process, the applicator 6 will be moved in such a manner that the furnace 5, which is likewise movable between first location 9 and second location 8, will surround the applicator 6 at all times. Thus, the applicator 6 does not move outside the furnace 5. Stated otherwise, the applicator 6, which is movable along the length of the substrate tube 2, will at all times be positioned within the furnace 5.

The deposition of glass layers inside the glass substrate tube 2 takes place along the distance of which the applicator 6 is moved. The substrate tube 2 is longer than the sum of the length of the furnace 5 and the furnace's "stroke" (i.e., the displacement distance over which the furnace is moved in the longitudinal direction of the substrate tube between first location 9 and second location 8).

EXAMPLE 1

Comparative

Figure 2:
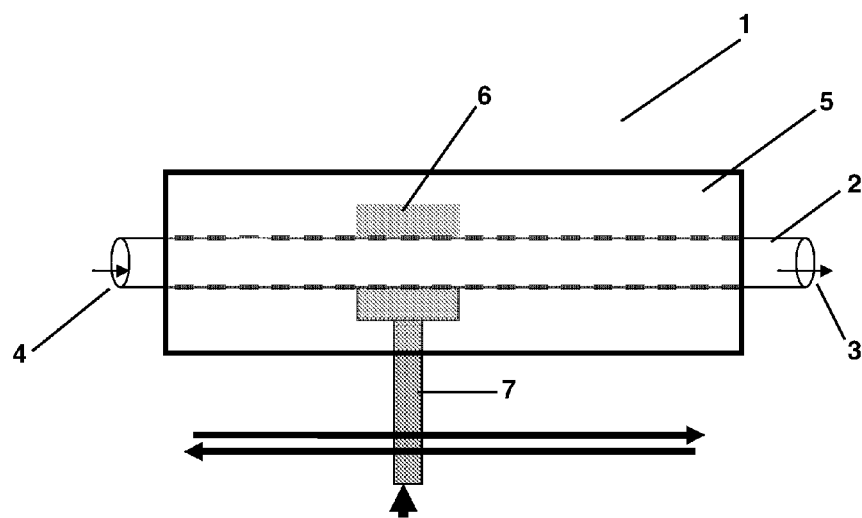
FIG. 2 schematically shows exemplary reciprocal movement of the applicator along a glass substrate tube.

A PCVD process was carried out in a conventional PCVD apparatus having a stationary furnace, a stationary substrate tube, and an applicator moving reciprocally over the substrate tube. During the PCVD process, glass-forming precursors were supplied to the interior of the substrate tube. Under the conditions that prevailed in the interior of the substrate tube and employing a typical applicator velocity of 20 m/min, concentric glass layers were deposited. After the deposition process had been terminated, the substrate tube thus obtained was subjected to a contraction process so as to obtain a solid rod. The movement of the applicator along the substrate tube is schematically depicted in FIG. 2 (via the arrows).

Figure 4:
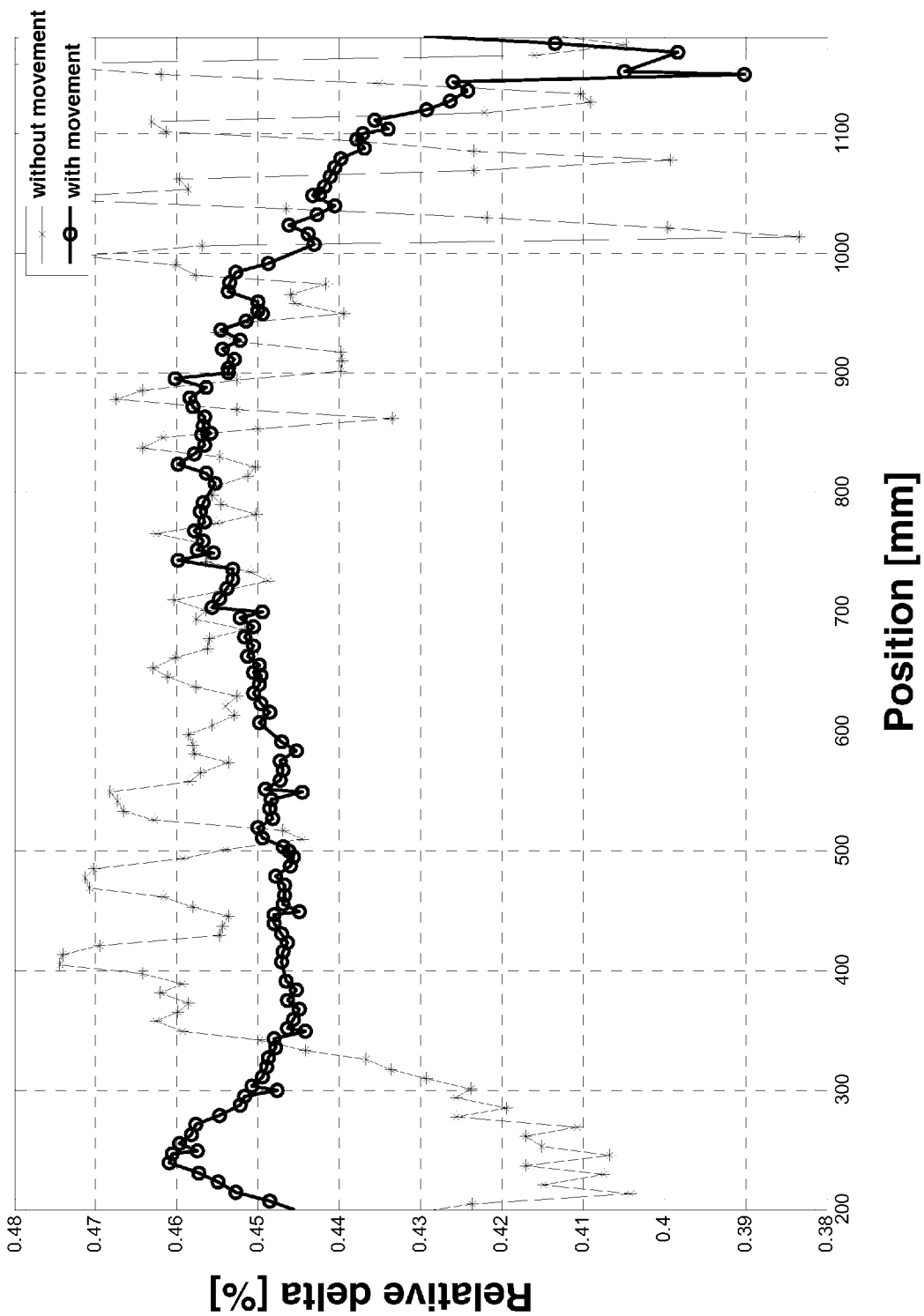
FIG. 4 shows the refractive index (relative to pure silica) of the core of a rod as a function of the axial position along the length of the preform.
Figure 5:
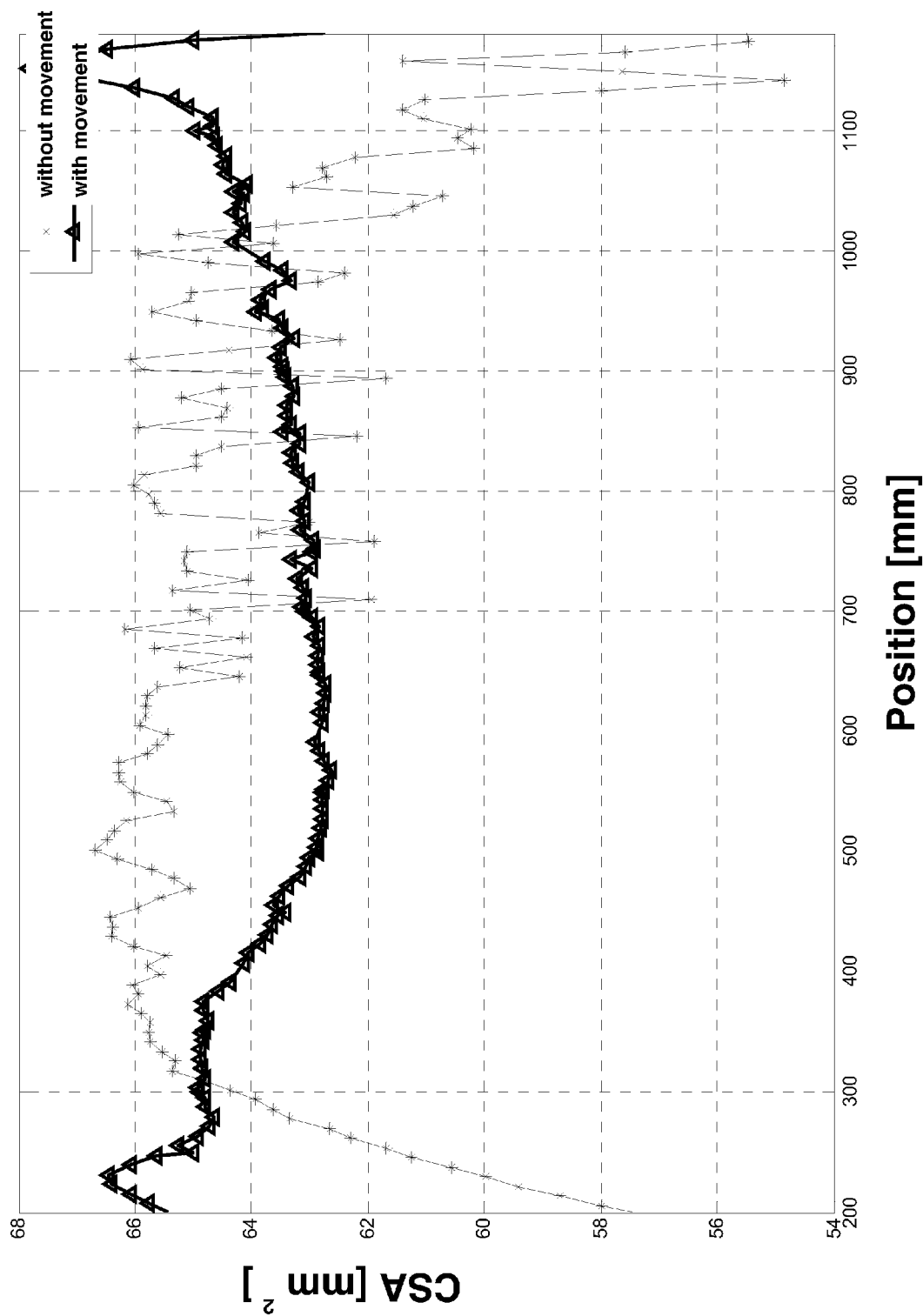
FIG. 5 shows the cross-sectional area (CSA) of a core of a rod as a function of the axial position along the length of the preform.

FIG. 4 shows the refractive index of the core of the rod (relative to pure silica) as a function of axial position. FIG. 5 shows the cross-sectional area (CSA) of the core of the rod as a function of axial position. Both FIG. 4 and FIG. 5 (i.e., "without movement" data) show that there is significant non-uniformity along the length of the glass rod (i.e., relative to the axial position of the glass rod). Such non-uniformity adversely affects several quality parameters of the optical fiber (e.g., attenuation, mode field width uniformity, and bandwidth uniformity) obtained from the glass preform.

EXAMPLE 2

Figure 3:
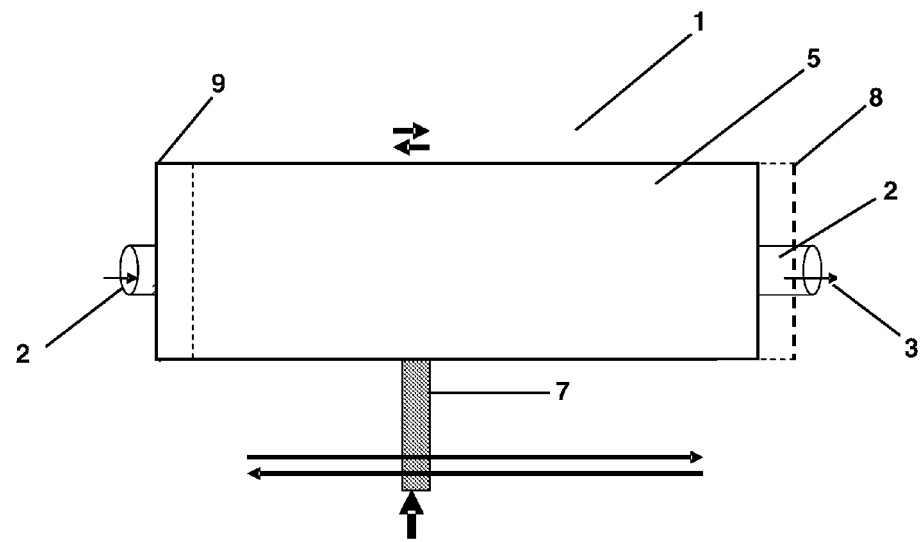
FIG. 3 schematically shows the respective exemplary reciprocal movements of the applicator and the furnace along a glass substrate tube.

The same PCVD apparatus as in Comparative Example 1 was used except that both the furnace and the applicator were moved along the length of the substrate tube. The substrate tube thus obtained was formed into a solid rod in the same manner (i.e., contraction) as in Comparative Example 1. The movement of the applicator along the substrate tube is schematically depicted in FIGS. 2 and 3 (via the longer arrows), and the movement of the furnace along the substrate tube is schematically depicted in FIG. 3 (via the shorter arrows).

FIG. 4 shows the refractive index of the core of the rod (relative to pure silica) as a function of axial position. FIG. 5 shows the cross-sectional area (CSA) of the core of the rod as a function of axial position. Both FIG. 4 and FIG. 5 (i.e., "with movement" data) show substantially uniform refractive index and substantially uniform cross-sectional area over a considerable length of the preform.

In brief, it is possible to significantly reduce, if not minimize, preform non-uniformity by moving both the applicator and the furnace relative to the substrate tube during the deposition process.

In the specification and figures, typical embodiments of the invention have been disclosed. The present invention is not limited to such exemplary embodiments. Unless otherwise noted, specific terms have been used in a generic and descriptive sense and not for purposes of limitation.

The invention claimed is:

1. A method for depositing one or more doped or undoped glass layers onto the interior of a glass substrate tube having a supply side and a discharge side via an apparatus;

the apparatus comprising an applicator having an inner wall and an outer wall and a microwave guide for guiding microwaves, wherein the microwave guide opens into the applicator, with the applicator extending around a cylindrical axis and being provided with a passage adjacent to the applicator's inner wall, through which microwaves supplied via the microwave guide can exit, the glass substrate tube being positionable over the cylindrical axis, the applicator being surrounded by a furnace that extends over the cylindrical axis, wherein the applicator is movable via an applicator stroke along the cylindrical axis between a point of reversal located at the glass substrate tube's supply side and a point of reversal located at the glass substrate tube's discharge side, wherein the furnace is reciprocally movable via a furnace stroke with respect to the glass substrate tube along the longitudinal axis thereof;

wherein the substrate tube is placed over the cylindrical axis, within the inner wall of the applicator, to which interior of the substrate tube glass-forming precursors are supplied, while the applicator is surrounded by a furnace that extends over the cylindrical axis, wherein the substrate tube and the applicator are essentially co-axial, wherein the applicator is moved reciprocally along a length of the substrate tube during the deposition process to create plasma conditions for forming glass layers on the interior surface of the glass substrate tube, wherein the furnace is moved with respect to the substrate tube along the longitudinal axis thereof during the deposition process, and wherein the furnace stroke is different from the applicator stroke.

2. A method according to claim 1, wherein the distance over which the furnace is moved along the longitudinal axis of the substrate tube is an uneven multiple of a quarter of the wavelength of the microwaves being used in the applicator.

3. A method according to claim 1, wherein the ratio between the cycle time of the furnace and the cycle time of the applicator does not equal an integer by which the longest cycle time is divided by the shortest cycle time.

4. A method according to claim 1, wherein the glass substrate tube is fixed to preclude significant lateral movement.

5. A method according to claim 1, wherein the furnace surrounds the applicator at all times during the deposition process.

6. A method according to claim 1, wherein the furnace is moved in a stepwise movement along the longitudinal axis of the substrate tube.

7. A method according to claim 1, wherein the furnace is moved continuously between a first point of reversal near one end of the substrate tube and a second point of reversal near the opposite end of the substrate tube.

8. A method according to claim 1, wherein the furnace is moved at a cycle time of between one and about 600 seconds.

9. A method according to claim 1, wherein the deposition process is a PCVD process.

10. A PCVD method for depositing one or more glass layers within the interior of a glass substrate tube, comprising:

supplying glass-forming precursors to the interior of a glass substrate tube that is fixed to preclude intentional lateral movement, the glass substrate tube having a supply side and a discharge side;

supplying microwave energy to a substantially cylindrical applicator that is positioned substantially coaxially around the glass substrate tube, the applicator having (i) an outer wall and (ii) an inner wall that defines a microwave passage to the exterior of the glass substrate tube;

positioning a furnace over a portion of the glass substrate tube and the applicator to heat the glass substrate tube;

during the step of supplying microwave energy to the applicator, moving the applicator along the substrate tube via an applicator stroke between a first point of applicator reversal and a second point of applicator reversal to form glass layers on the glass substrate tube's interior surface, wherein the first point of applicator reversal is nearer to the glass substrate tube's supply side than is the second point of applicator reversal, and the second point of applicator reversal is nearer to the glass substrate tube's discharge side than is the first point of applicator reversal; and during the step of supplying microwave energy to the applicator, moving the furnace along the substrate tube via a furnace stroke;

wherein, during the step of supplying microwave energy to the applicator, the length of the furnace stroke is different from the length of the applicator stroke.

11. A method according to claim 10, wherein both the applicator and the furnace are reciprocally moved along the substrate tube during PCVD.

12. A method according to claim 10, wherein the steps of (i) moving the applicator and (ii) moving the furnace are performed in such a manner that the furnace surrounds the applicator at all times during the deposition process.

13. A method according to claim 10, wherein the furnace is moved in a stepwise movement along the longitudinal axis of the substrate tube.

14. A method according to claim 10, wherein the furnace is moved continuously between a first point of furnace reversal and a second point of furnace reversal, wherein the first point of furnace reversal is nearer to the glass substrate tube's supply side than is the second point of furnace reversal, and the second point of furnace reversal is nearer to the glass substrate tube's discharge side than is the first point of furnace reversal.

15. A method according to claim 10, wherein the furnace is moved at a cycle time of between one and about 600 seconds.

* * * * *

UNITED STATES PATENT AND TRADEMARK OFFICE
CERTIFICATE OF CORRECTION

PATENT NO. : 7,981,485 B2
APPLICATION NO. : 11/939931
DATED : July 19, 2011
INVENTOR(S) : Mattheus Jacobus Nicolaas Van Stralen et al.

Page 1 of 1

It is certified that error appears in the above-identified patent and that said Letters Patent is hereby corrected as shown below:

Title Page:

Bibliographic Data under Item (73)

Reads: Assignee: ~~Drake~~ Comteq, B.V., Amsterdam (NL)

and should read: Assignee: <u>Draka</u> Comteq, B.V., Amsterdam (NL)

Signed and Sealed this
Fifth Day of June, 2012

David J. Kappos
*Director of the United States Patent and Trademark Office*